United States Patent [19]

Eidejus

[11] 4,335,848
[45] Jun. 22, 1982

[54] SYSTEM OF CENTRAL HEATING

[76] Inventor: Edvardas Eidejus, 2558 West 69th St., Chicago, Ill. 60629

[21] Appl. No.: 260,313

[22] Filed: May 4, 1981

Related U.S. Application Data

[63] Continuation of Ser. No. 164,689, Jun. 30, 1980, abandoned.

[30] Foreign Application Priority Data

Sep. 12, 1979 [AU] Australia .......................... PE00435

[51] Int. Cl.³ .............................................. F24D 3/02
[52] U.S. Cl. .................................... 237/8 R; 137/94; 165/22; 236/94; 237/63
[58] Field of Search ...................... 137/94; 165/11, 22; 236/94; 237/8 R, 63

[56] References Cited

U.S. PATENT DOCUMENTS

| | | | | |
|---|---|---|---|---|
| 2,153,382 | 4/1939 | Martin | ............................ | 237/8 R X |
| 4,171,771 | 10/1979 | Colthorpe | ............................ | 237/8 R |
| 4,221,260 | 9/1980 | Otala | ............................ | 165/11 R X |
| 4,245,501 | 1/1981 | Feller | ............................ | 165/11 R X |

FOREIGN PATENT DOCUMENTS

| | | | | |
|---|---|---|---|---|
| 2416428 | 8/1979 | France | ................................ | 237/8 R |
| 1207347 | 9/1970 | United Kingdom | .................. | 237/63 |

Primary Examiner—Robert G. Nilson
Attorney, Agent, or Firm—David D. Kaufman

[57] ABSTRACT

A system for improving efficiency and effecting fuel conservation in buildings with multiple units heated by forced hot water from a central gas-fired boiler. Each unit or apartment is provided with a circulator pump in the return water pipe and an associated gas valve and meter. When the user in a unit turns on the heat, the circulator pump in that zone is activated to automatically open the associated gas valve which is operated by means of hydraulic pressure differential. The gas from all units flows to a common gas reservoir for discharge to the boiler.

3 Claims, 2 Drawing Figures

SYSTEM OF CENTRAL HEATING

This application is a continuation of application Ser. No. 164,689, filed June 30, 1980, now abandoned.

This invention relates to certain improvements in the control of gas supply in the system of central heating by forced hot water gas fired boilers.

Existing systems do not have any zone control or meter of gas supply for individual householders in buildings of multiple flats, and common heating is now mainly used. It is not convenient for the residents as they can not self regulate the temperature in their residences. Some buildings have installed separate circulators and wall thermostats for each flat, so that the residents can self control the heating, it is more convenient for the residents, but the owner of the building cannot control the amount of gas being used, and some careless consumers can waste a lot.

In America, some owners try to avoid those inconveniences by installing separate boilers for each flat, but that is costly installation and expensive to run.

The common boiler system is the most economical, with cheaper installation and maintenance as many consumers draw heating from one boiler, it rarely becomes cool.

The object of this invention is to create individual control of gas supply, enabling residents to use a common boiler and personally regulate the heating of their flats. It is accomplished by constructing automatic gas valve opener activated when the zone circulator is working.

According to the invention, there is provided a system of central heating by forced hot water, gas fired boiler with separate automatic gas valve openers, separate circulators and separate wall thermostats provided for every flat which makes possible individual control of gas supply and enables tenants to personally regulate the heating of their residences by using the common boiler.

A particular embodiment of the invention will now be described with references to the accompanying drawings in which.

Figure 1:
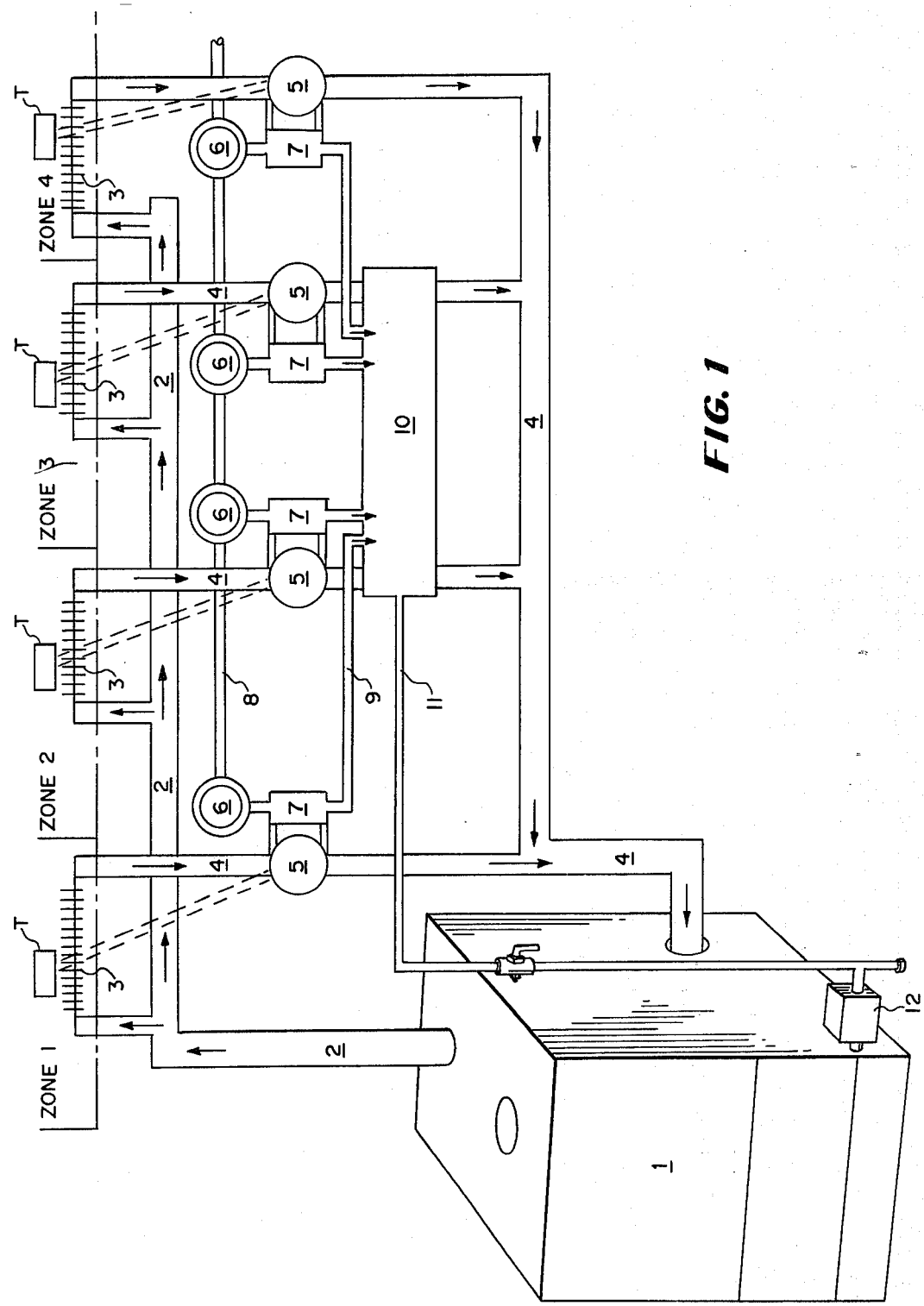
FIG. 1 is a diagram of the system embodying the improvements.
Figure 2:
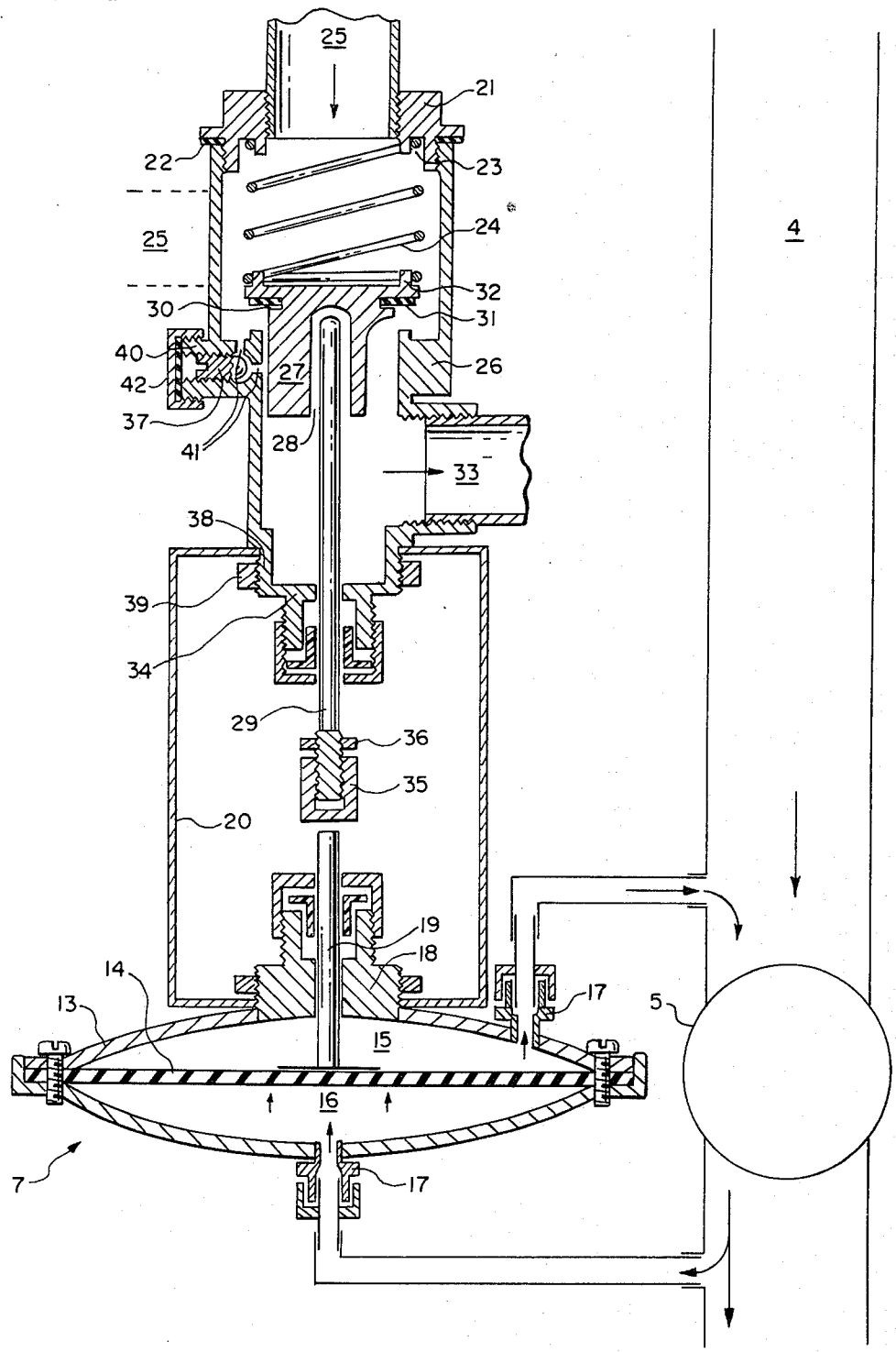
FIG. 2 is a plan of automatic gas valve opener showing the construction and connection to the system.

By using the wall thermostat T in any individual flat, the householder activates his circulator 5 then the gas valve opener 7 opens the valve of his individual gas meter 6 and supplies the gas as long as his circulator is working. When the circulator stops, the gas valve opener 7 automatically switches off the gas. If at the same time two or more circulators are working, then the gas flows from two or more gas meters, but accordingly slower, as the burner M boiler always takes the same amount of gas in spite of how many circulators are working. The gas flows from all individual gas meters through outlet pipe 9 to the common gas reservoir 10 which communicates with the burner through pipe 11 and central valve 12 and which ensures that the amount of gas discharged by the burner remains constant during fluctuations in the gas pressure.

Operation of the valve opener 7 for the system of central heating by forced hot water gas fired boilers is automatic and is based on the power of water pressure produced by acting circulator. It is the key to the individual control of gas supply in that heating system. It does not involve any water stream nor does it waste any energy of the circulator.

When the circulator is not working, the water pressure in hot water pipe 4 returning water from the radiator 3 is equal above and below the circulator. When the circulator starts to work, the water pressure in pipe 4, below the circulator, becomes stronger than above the circulator. By exploiting the differing water pressure produced by the action of circulator, the gas valve opener is constructed as follows:

Drum 13 comprising of two shells, divided by rubber diaphragm 14 in two parts 15 and 16 both parts are provided with unions 17 to be connected to the system. Part 15 is connected to hot water pipe 4 above circulator 5, part 16 is connected with the same pipe 4 below circulator 5. In centre of part 15 there is a bearing 18 which holds sliding pin 19. A gas valve is firmly connected to the valve opener by respectively formed bracket 20. They are connected in such a way that the sliding pin 19 is pointing against sliding pin 29. When the circulator starts to work, it sucks water from part 15 and at the same time forces the water in part 16. The water pressure in diaphragm 14 pushes sliding pin 19 towards pin 29, which opens valve 27 and keeps it open as long as the circulator is working. When the circulator stops, water pressure in parts 15 and 16 becomes equal, spring 24 presses down valve 27 and shuts it off.

To make the unit of gas valve opener simple and effectual, the gas valve is modified to cooperate with the gas valve opener, and the construction of the gas valve is adapted to that purpose as follows:

The existing valve has a solid top 21 threaded in the chamber, it overlaps the edges of the chamber and the gasket 22 seals the gas. It has a groove 23 to receive spring 24. On one side it has gas inlet 25, below the inlet is a partition 26 dividing the chamber in two parts—upper and lower. In centre of partition is an opening to receive valve 27 which is shaped like a disc with a leg hanging down, the leg is shaped like a three pointed star. In centre of the leg is a hole 28 to receive sliding pin 29. The upper part of valve 27 is overlapping the edges of the opening. Groove 30 is formed around the leg below disc to receive gasket 31. On top of the valve is a formed elevated ring 32 to hold spring 24 in position. Below the valve there is gas outlet 33. Below outlet 33 is a bearing 34 holding sliding pin 29 with adjustment nut 35 and lock nut 36 on the end. Further details constitute the modifications:

A. Gas inlet 25 is changed from side to top. There is a suitable hole formed in the top 21 to receive gas pipe coming from gas meter 6.

B. On the opposite side of gas outlet 33 there is a formed adjustable pilot feeding gas outlet 37 as follows:

Outside the chamber opposite partition 26 is extention 40 approx. 7 mm long and 10 mm in diameter. In centre of extention 40 is a made threaded hole 6 mm in diameter to receive bolt 37 leaving approx. 2 mm solid wall to the valve opening. 2 mm hole 41 is made from the upper side of chamber and through the wall in valve opening, so that the gas can flow from upper part of chamber to the lower part. By turning bolt 37 forwards and backwards gas can be regulated or shut off completely. On top of the extention there is a threaded cup 42 with a gasket which seals the gas from leaking out.

C. A 10 mm threaded extention 38 is formed to receive bracket 20 and nut 39 to be threaded to the valve opener.

I claim:

1. In a central hot water heating system including a gas fired boiler, a plurality of zones each having hot water radiator means, a return water pipe associated with each of said zones for returning water back to the boiler, and thermostat control means in each of said zones, the improvement comprising:
gas valve and metering means associated with each of said zones and communicating with the burner for said broiler;
a circulator pump connected to each of said water return pipes and operable responsive to said thermostat control means; and
gas valve actuator means connected between each of said gas valves and circulator pumps and being responsive to the operation of said pump to open its associated gas valve.

2. The heating system of claim 1 and comprising further a common gas reservoir connected between said burner and all of said gas valve means.

3. The heating system of claim 1 in which said actuator means comprises a diaphragm with opposite sides in liquid communication with said return pipe respectively upstream and downstream of said circulator pump whereby operation of the pump causes a change in hydraulic pressure to move the diaphragm and open its associated gas valve.

* * * * *